United States Patent Office 3,532,771
Patented Oct. 6, 1970

3,532,771
PROCESS OF PREPARING POWDERY COPOLYMERS OF VINYL ETHERS AND MALEIC ANHYDRIDE USING POLYMERIC ANTI-CLUMPING ADDITIVES DERIVED FROM VINYL ALKOXYALKYL ETHERS
Nathan D. Field, Allentown, Pa., and Donald H. Lorenz, Piscataway, N.J., assignors to GAF Corporation, a corporation of Delaware
No Drawing. Filed Mar. 8, 1967, Ser. No. 621,474
Int. Cl. C08f 15/40
U.S. Cl. 260—875      6 Claims

ABSTRACT OF THE DISCLOSURE

Powdery copolymers are prepared by copolymerizing maleic anhydride with at least one vinyl ether of the formula $$CH_2=CH-OR$$

wherein R is an alkyl of from 1 to 8 carbon atoms or an alkoxy or polyalkoxy group of the formula $$-(CH_2CH_2-O)_n R'$$

wherein R' is an alkyl of from 1 to 4 carbon atoms and $n$ is a positive integer of from 1 to 4 in the presence of a liquid aromatic hydrocarbon as solvent diluent and in the presence of a free radical catalyst and a small amount of a polymer additive which is soluble in water and also soluble in the said liquid aromatic hydrocarbon as an anti-clumping agent, i.e., agent that prevents agglomeration and tends to yield a slurry of high solids content of a granular copolymer.

This anti-clumping agent includes polymers of monomers of the formula $$CH_2=CH-O-(CH_2CH_2-O)_n R'$$

where $n$ and $R'$ have the same values as above as well as copolymers of one or more of this series of monomers with methyl vinyl ether.

BACKGROUND OF THE INVENTION

The present invention relates to an improved process of copolymerizing maleic anhydride with at least one monomer of the group consisting of vinyl alkyl ethers and vinyl alkoxyalkyl ethers in the presence of a small amount of a polymer of a vinyl alkoxyalkyl ether in slurries of high solid content to yield powdery copolymers which form aqueous solutions on pH adjustment which, are clear at room temperature and below, having a cloud point at a temperature ranging from about 50° to about 80° C.

DESCRIPTION OF PRIOR ART

It is well known that lower alkyl vinyl ethers copolymerize with maleic anhydride in benzene solution in the presence of a free radical catalyst and in the absence of molecular oxygen at temperatures of from 40° to about 120° C. Vinyl methyl ether/maleic anhydride copolymer prepared by such procedure is soluble in ester and ketone solvents and dissolves in water, aqueous alkali and aqueous acid with hydrolysis of the anhydride moieties. Copolymers of maleic anhydride with alkyl vinyl ethers (where the alkyl group is of 3 or more carbon atoms, prepared by such procedure, give viscous solutions in ester and ketone solvents, do not dissolve to any great extent in water, but dissolve in aqueous alkali.

The preparation of lower alkyl vinyl ether/maleic anhydride copolymers by the foregoing procedure in slurries of greater than 20–25% solid content often yields solid products which are clumped on the stirrer, baffle and on the wall of the copolymerizing vessel and as a consequence are difficult to remove and to process.

To overcome the foregoing deficiencies, it has been proposed in the art to conduct the copolymerization in the presence of anti-clumping agents (granulating agents) so as to provide powdery products. The anti-clumping or granulating agents proposed include polystyrene, acrylate ester/styrene copolymer, poly (vinylcarboxylate) such as polyvinyl acetate, polyvinyl ethyl ether, polyvinyl isobutyl ether and polyvinyl methyl ether. These polymers (anti-clumping agents) are either insoluble in water or, in the case of poly(methylvinyl ether), only soluble below 30°–32° C. in water. Thus when used in the polymerization of the lower alkylvinyl ether/maleic anhydride copolymers, the anti-clumping agents must be removed if a clear aqueous solution of the product is desired at around room temperature or above. This requires that filtration and washing steps be introduced to remove the additive at the end of the polymerization.

The art describes the preparation of polymers other than vinyl ether/maleic anhydride copolymers which have a similar problem, i.e., a tendency to clump when prepared in slurries of high solids in organic solvent-diluents. It has been proposed to use water-insoluble, oil-soluble polymers as anti-clumping or granulating agents in these polymerization systems in which the resulting product (polymer) is insoluble in the medium in which the polymerization is performed. Such granulating agents include homopolymers or copolymers of $C_5$–$C_{18}$-alkyl methacrylates, vinyl ($C_6$–$C_{18}$) alkyl ethers, ($C_4$–$C_{18}$)-alkyl ethers, ($C_4$–$C_{18}$)-alkyl vinyl sulfides and vinyl ($C_6$–$C_{18}$) alkanolates with vinyl nitrogen containing compounds.

SUMMARY OF THE INVENTION

The improved process of the present invention comprises the copolymerization of an alkyl vinyl ether, alkoxy alkyl vinyl ether or a mixture of such ethers with maleic anhydride in the presence of a free radical initiator and an anti-clumping agent which is soluble in the organic medium in which the copolymerization is conducted and also soluble in water. The anti-clumping agents employed are compatible with aqueous solution of the formed copolymers and need not be removed therefrom, i.e., no filtration or washing is necessary. Such anti-clumping agents include homopolymers of monomers of alkoxy alkyl vinyl ethers as well as copolymers of two or more different alkoxy alkyl vinyl ethers or copolymers of an alkoxyalkyl vinyl ether and methyl vinyl ether.

DESCRIPTION OF THE PREFERRED EMBODIMENTS

Powdery copolymers are prepared in accordance with the present invention by copolymerizing alkyl vinyl ethers, alkoxy alkyl vinyl ethers or mixtures of such ethers with maleic anhydride in the presence of an inert organic liquid diluent at high solids content in which the monomeric reactants are substantially soluble and the resulting copolymer is insoluble. Solvent diluents of this type include benzene, toluene and xylene in the form of their o-, m-, or p-isomers. As catalyst or copolymerization initiator, benzoyl peroxide, azobisisobutyronitrile, lauroyl peroxide, di-t-butyl peroxide and the like may be employed in the proportion of 0.01 to 2 percent based on total weight of monomers. The copolymerization is effected in the presence of an anti-clumping agent, i.e., a polymer of an alkoxy alkyl vinyl ether, which should be present in the proportion of 0.1 to 5 percent based on the total weight of monomers present in the copolymerization reaction mixture. The anti-clumping agent should be soluble in the inert organic solvent diluent as well as soluble in water and should have a Fikentscher K value of about 20 to about 100, which is equivalent to an average molecular weight of from about 10,000 to about 250,000 and above. By the presence of the anti-clumping agent in the copolymerization reaction mixture, it is possible to obtain a copolymer slurry of very high solid (30–70%) content, preferably in the range of 30–50% for ease of manipulation. Upon removal of the organic diluent medium, the copolymer is obtained as a solid of particulate particles. In the absence of such anti-clumping agent, the copolymerization can only be done at low slurry solids (10–25%) or the product will conglomerate, making it unworkable.

The copolymerization is preferably conducted in a conventional closed vessel, although γ-ray, X-rays or U.V. radiations, etc., may be used to initiate the free radical chain reaction. It will be evident to those skilled in the art that the choice of catalyst depends on the temperature of copolymerization. While in principle a very wide range of temperatures can be employed, the preferred temperature range, however, is from about 40° to about 120° C.

The alkyl vinyl ethers that are copolymerized with maleic anhydride are those in which the alkyl (straight-chain or branched) group is from 1 to 8 carbon atoms such as, for example, vinyl methyl ether, vinyl ethyl ether, vinyl propyl ether, vinyl isopropyl ether, vinyl n-butyl ether, vinyl isobutyl ether, vinyl n-amyl ether, vinyl n-hexyl ether, vinyl n-heptyl ether, and vinyl octyl ether.

The alkoxyalkyl vinyl ethers that are copolymerized with maleic anhydride are those that are characterized by the following general formula:

$$CH_2=CH-O(CH_2CH_2-O)_n R'$$

wherein R' is an alkyl of from 1 to 4 carbon atoms and $n$ is a positive integer of from 1 to 4. Illustrative species of such alkoxyalkyl vinyl ethers are characterized by the following formulae:

$CH_2=CHOCH_2CH_2OCH_3$
methoxyethyl vinyl ether
$CH_2=CHOCH_2CH_2OC_2H_5$
ethoxyethyl vinyl ether
$CH_2=CHOCH_2CH_2OC_3H_7$
propoxyethyl vinyl ether
$CH_2=CHOCH_2CH_2OC_4H_8$
butoxyethyl vinyl ether
$CH_2=CHO(CH_2CH_2O)_2CH_3$
methoxyethoxyethyl vinyl ether
$CH_2=CHO(CH_2CH_2O)_2C_2H_5$
ethoxyethoxyethyl vinyl ether
$CH_2=CHO(CH_2CH_2O)_2C_4H_9$
butoxyethoxyethyl vinyl ether
$CH_2=CHO(CH_2CH_2O)_3CH_3$
methoxyethoxyethoxyethyl vinyl ether
$CH_2=CHO(CH_2CH_2O)_3C_2H_5$
ethoxyethoxyethoxyethyl vinyl ether
$CH_2=CHO(CH_2CH_2O)_3C_4H_9$
butoxyethoxyethoxyethyl vinyl ether
$CH_2=CHO(CH_2CH_2O)_4-CH_3$
methoxyethoxyethoxyethoxyethyl vinyl ether
$CH_2=CHO(CH_2CH_2O)_4C_4H_9$
butoxyethoxyethoxyethoxyethyl vinyl ether The anti-clumping or granulating agents employed in accordance with the present invention are either homopolymers or copolymers of the foregoing alkoxyalkyl vinyl ethers. The copolymers of such alkoxyalkyl vinyl ethers may consist of from 5 to 95 mole percent of any one of the above illustrated monomers, with from 95 to 5 mole percent of a different alkoxyalkyl vinyl ether selected from the foregoing illustrations or with 50 to 5 mole percent of methyl vinyl ether. When employing either the homopolymer or copolymer of such alkoxyalkyl vinyl ethers, it is essential that the average molecular weight be at least 10,000 and may range to as high as 250,000 and above.

In practicing the present invention, 1 mole of maleic anhydride and 1 mole with 2 percent to 15 percent by weight of excess of either vinyl alkyl ether or alkoxyalkyl vinyl ether or an equal mixture of such ethers are copolymerized in solution of an inert organic aliphatic or aromatic hydrocarbon in the presence of the anti-clumping or granulating agent. The amount of inert organic aliphatic or aromatic hydrocarbon solvent diluent is not critical and any amount that yields a workable solution of the comonomeric materials and anti-clumping agent may be employed. The amount of free radical catalyst or copolymerization initiator is in the proportion of 0.01 to 2 percent by weight based on the total weight of the comonomeric mixture. The amount of anti-clumping agent is usually in the proportion of 0.1 to 5 percent by weight based on the weight of the total comonomer present in the copolymerization reaction mixture.

Any organic inert aliphatic or aromatic hydrocarbon solvent which is inert under the copolymerizing conditions may be used as the copolymerizing medium. Suitable inert organic diluents that may be employed are the hydrocarbon solvents, such as hexane, heptane, octane, benzene, toluene, or mixtures thereof.

The temperature at which the copolymerization reaction is carried out may be varied over a wide range of temperatures. However, we prefer a temperature range from 40° to about 120° C.

In conducting the copolymerization reaction, any conventional polymerizing vessel may be employed. However, for the purpose of the present invention we prefer a cleaned and dried stainless steel autoclave equipped with a turbine type agitator, baffles, condenser and pressure equalized dropping funnel.

In initiating the copolymerization reaction, a mixture consisting of maleic anhydride, anti-clumping agent and inert organic solvent diluent is first charged to the copolymerizing vessel. The copolymerizing vessel is then purged with air by pulling vacuum (100 mm. to 300 mm.) and released with nitrogen. The purging may be, if desired, repeated one or two more times. The mixture in the copolymerizing vessel is then heated to a temperature within the range of 40°–120° C., preferably to about 70°–75° C., at which point the free radical catalyst is added. The latter may be as the solid or in solution of the same inert organic solvent diluent that was employed in preparing the initial copolymerizing mixture. To the resulting mixture there is then added 1 mole with a 2–15% by weight excess of a vinyl alkyl ether, an alkoxy vinyl ether or a mixture of such ethers over a sufficient period of time, usually over 1 to 2 hours, until the standard test for the presence of maleic anhydride is negative. The resulting copolymeric product is in the nature of a viscous slurry and readily removed from the copolymerizing vessel. The inert organic solvent diluent is removed by conventional means, preferably under vacuum and the recovered solid product dried to constant weight.

The following examples will illustrate the preparation of the copolymers in the presence of the anti-clumping agents and the results that are obtained by the use of such anti-clumping agents:

EXAMPLE I

This example will show the results of copolymerizing a vinyl alkyl ether and maleic anhydride without the presence of an anti-clumping agent.

A two-gallon stainless steel autoclave with turbine type agitator and baffles was cleaned and dried. Into the autoclave was charged a mixture of 2200 grams of benzene and 592 grams of maleic anhydride. The autoclave was then purged of air by pulling vacuum (100 mm. Hg) and released with nitrogen. This was repeated two more times. The mixture was then heated to 75° C. At 75° C., 3.2 grams of lauroyl peroxide dissolved in 100 cc. of benzene was added. Methyl vinyl ether (403 grams, 15% excess) was added over a period of 1 hour. An exotherm was observed and the temperature reached 104° C. After the exotherm, the temperature was maintained at 75° C. for 2 hours. The test for maleic anhydride was still positive, but the autoclave was cooled to room temperature and opened. The solid material was clumped on the stirrer, baffle and on the wall of the autoclave and was difficult to recover.

EXAMPLE II

This example will show the results of the same copolymerization as in Example I with the exception that polyvinyl methyl ether of a K value of 66 is employed as anti-clumping agent.

A two-gallon stainless steel autoclave with turbine type agitator and baffles was cleaned and dried. Into the autoclave was charged a mixture of 2200 grams of benzene, 592 grams of maleic anhydride and 18.9 grams of atactic poly(vinyl methyl ether), K–66.

The autoclave was purged of air and filled with nitrogen. The mixture was heated to 75° C. and then 3.2 grams of lauroyl peroxide dissolved in 100 ml. of benzene added. Methyl vinyl ether (403 grams, 15% excess) was added over a period of 1 hour. After adding all the methyl vinyl ether, the reaction was held at 75° C. for 1 hour. The test for maleic anhydride was negative, indicating complete reaction. Product was a viscous slurry which was easily removed from autoclave. After drying, the copolymer was obtained as a fine powder in high yield. The relative viscosity of a 1% solution in methyl ethyl ketone was 1.67.

A solution was prepared by adding 5 grams of polymer to 100 ml. of water with heating and stirring. The solution was cloudy even when cooled to and below room temperature.

EXAMPLE III

This example shows the advantages that are obtained by employing a polymer of an alkoxyalkyl vinyl ether monomer as the anti-clumping agent.

A two-gallon stainless steel autoclave with turbine type agitator and baffles was cleaned and dried. Into the autoclave was charged a mixture of 2200 grams of benzene, 921 grams of maleic anhydride and 29.3 grams of poly-(methoxyethoxyethyl vinyl ether) having a K value of 33.

The autoclave was then purged of air by pulling vacuum (100 mm. Hg) and released with nitrogen. This was repeated two more times. The mixture was then heated to 75° C. At 75° C., 5.0 grams of lauroyl peroxide dissolved in 100 cc. of benzene was added. Methyl vinyl ether (627 grams, 15% excess) was added over a period of 1 hour. After adding all the methyl vinyl ether, the reaction was held at 75° C. for an additional 2 hours. Product was a viscous slurry, easily removed from autoclave. The reaction mixture was evaporated to dryness, yielding a powdery copolymer which had a relative viscosity of 1.8 (1% in methyl ethyl ketone).

A solution was prepared by dissolving 4 grams of the polymer in 100 cc. of water by heating and stirring. The solution was clear at room temperature with a slight cloud point at 74° C.

EXAMPLE IV

Polymethoxy ethyl vinyl ether (28 grams, K–40) was dissolved in 900 ml. of benzene. Maleic anhydride (700 grams) was dissolved in 1400 ml. of benzene with heating. After solution had cooled to room temperature, the two solutions were combined. The combined solutions were added to a clean and dry 2-gallon autoclave equipped with 4-blade turbine stirrer with baffle, condenser and pressure equalized dropping funnel. When the temperature reached 75° C., a catalyst solution made by dissolving 3.6 grams of lauroyl peroxide in 100 ml. of benzene was added. Addition of 735 grams of isobutyl vinyl ether, 3% excess, was started and controlled so that the addition required 2 hours. One-half hour after addition was complete, a test indicated that maleic anhydride was completely reacted.

After the reactor had cooled to room temperature, it was opened and no clumped solid was observed but the polymer was slurried in the benzene. The slurry was removed from the autoclave and, without filtering, benzene was removed under vacuum at 80° C. on a rotary evaporator to give a white powdery copolymer. The copolymer was further dried by placing in a vacuum oven overnight. A sample removed had a relative viscosity at 1% in acetone at 30° C. of 1.57.

A 5% solution in water was prepared by adding 5 grams of the copolymer to 80 ml. of water and adjusting the pH to 8 with 4% aqueous potassium hydroxide, with stirring and heating. As the copolymer dissolved, the pH dropped and more base added until final dissolution and adjustment to pH 7. Additional water was then added as needed. The solution on heating exhibited a slight cloud point at 64° C.

EXAMPLE V

A solution was prepared by dissolving 0.9 gram of poly(methoxyethoxyethyl vinyl ether) having a K value of 45 and 0.15 gram of lauroyl peroxide in 100 ml. of benzene was added to a 500 ml. resin kettle equipped with stirrer, condenser, thermometer and pressure equalized dropping funnel. Air was purged from the kettle by successive evacuation and filling with nitrogen. After establishing a slight positive nitrogen pressure, the temperature was raised to 70° C. and 25 ml. of a solution made by dissolving 48.0 grams of isobutyl vinyl ether, 5% excess, and 44.5 grams of maleic anhydride in 200 ml. of benzene was added. After waiting 15 minutes and allowing temperature to reach 75° C., the remainder of solution was added over 1½ hours. The test for maleic anhydride was negative 15 minutes after addition was complete.

After cooling to room temperature, the benzene was evaporated from the slurry under reduced pressure and the fine white powder placed in a vacuum oven to constant weight. Dry weight of product was 85 grams and had a relative viscosity 1% in acetone of 1.43.

A 4% solution in water was prepared by dissolving 4 grams of polymer with adjustment of pH to 7 with aqueous potassium hydroxide and final adjustment of water level to 100 cc. The solution was clear at room temperature but became slightly hazy on heating to above 80° C.

EXAMPLE VI

To a clean, dry 500 ml. resin kettle equipped with stirrer, condenser, thermometer and pressure equalized dropping funnel was added 44.5 grams of maleic anhydride, 0.196 gram of lauroyl peroxide, 1.0 gram of poly-(methoxyethyl vinyl ether) K–75.5 and 300 ml. of benzene. When the temperature reached 72° C., 5 ml. of methoxyethyl vinyl ether was added. The temperature was raised to 75° C. and 10 minutes later addition of the remainder of the vinyl ether was started and controlled so that the 54 grams was added over a period of 1½ hours. Five minutes after addition was complete, the test for maleic anhydride was negative.

The solvent was removed under vacuum on a rotary evaporator and the solid further dried to constant weight in a vacuum oven. The yield of dry powder was 88 grams and had a viscosity number of 0.93–1% in acetone. The copolymer is soluble in water. A 5% aqueous solution is clear at room temperature but shows a slight cloud point at 56° C.

EXAMPLE VII

To a clean, dry 500 ml. resin pot equipped with stirrer, condenser, thermometer and pressure equalized dropping funnel was added a solution of 1 gram of poly(methoxyethyl vinyl ether), K–40 in 100 ml. of benzene. Solid lauroyl peroxide 0.15 g. was added as the temperature reached 50° C. When the temperature reached 70° C., 25 ml. of a benzene solution made by dissolving 48.0 grams of n-butyl vinyl ether, 5% excess, and 44.5 grams of maleic anhydride in 200 ml. of benzene was added. After waiting 15 minutes and bringing the temperature to 75° C., the addition of the remainder of the solution was made over 1½ hours. The test for maleic anhydride was negative ½ hour after the addition was complete. After cooling to room temperature, the benzene was removed from the slurry under reduced pressure in a rotary evaporator giving a white powdery solid. The solid was further dried in a vacuum oven overnight to constant weight. The yield of dry product was 80 grams and had a specific viscosity of 0.48 (1% in acetone). The product was soluble in dilute aqueous caustic solution giving a clear solution at room temperature (solution prepared as in Example IV).

EXAMPLE VIII

To a clean, dry 500 ml. resin flask equipped with stirrer, condenser, thermometer and pressure equalized dropping funnel was added a solution of 6 grams of poly-(methoxyethoxyethyl vinyl ether) having a K value of 45, in 125 ml. of benzene. Solid lauroyl peroxide 0.2 g. was added as the temperature reached 65° C. When the temperature reached 70° C., 25 ml. of a benzene solution made by dissolving 81 grams, 5% excess, of 2-ethylhexyl vinyl ether and 49.0 grams of maleic anhydride in 300 ml. of benzene was added. After waiting 15 minutes and bringing the temperature to 75° C., the addition of the remainder of the solution was made over 1½ hours. The test for maleic anhydride was negative 1 hour after the addition was complete. After cooling to room temperature, the benzene was removed from the slurry under reduced pressure in a rotary evaporator, giving a white powdery solid. The solid copolymer was further dried in a vacuum oven overnight to constant weight. The yield of dry product was 127 grams and had a relative viscosity of 1.52 (1% in methylethyl ketone). The product was soluble in dilute aqueous caustic solution giving a clear solution at room temperature (solution prepared as in Example IV).

EXAMPLE IX

To a clean, dry 500 ml. resin kettle equipped with a stirrer, condenser, thermometer and pressure equalized dropping funnel was added 49.0 grams of maleic anhydride, 0.18 gram lauroyl peroxide, 3.0 grams of poly-(methoxyethoxyethoxyethyl vinyl ether) having a K value of 41 and 350 ml. of benzene. When the temperature reached 70° C., 5 ml. of n-octyl vinyl ether was added. The temperature was raised to 75° C. and 10 minutes later, addition of the remainder of the vinyl ether was started and controlled so that a total of 82 grams 5% excess) was added over a period of 1½ hours. The test for maleic anhydride showed its absence 1½ hours after addition was complete.

The solvent was removed under vacuum on a rotary evaporator and the solid further dried to constant weight in a vacuum oven to yield 125 grams of dry powder which has a viscosity of 0.32 (1% in methylethyl ketone). The copolymer was soluble in dilute alkali to yield a clear solution at room temperature.

EXAMPLE X

To a clean dry 500 ml. resin flask equipped with stirrer, condenser, thermometer and pressure equalized dropping funnel was added 2.5 grams of a copolymer of methyl vinyl ether/methoxy ethyl vinyl ether (33/66 mole percent) having a K value of 40, 0.277 gram of lauroyl peroxide and 115 ml. benzene. This solution was heated to 70° C. and 30 ml. of a solution made by dissolving 49.0 grams of maleic anhydride and 77.0 grams of methoxyethoxyethyl vinyl ether in 250 ml. of benzene was added. After waiting 15 minutes, the remainder of the solution was added over 2½ hours. After waiting ½ hour, the test for maleic anhydride showed that it all had reacted.

The solvent was removed under vacuum on a rotary evaporator, giving a white solid which was dried to constant weight overnight. Yield was 120 grams and had a relative viscosity of 1.86 (1% in acetone). The polymer was soluble in water with stirring and heating to yield a clear solution. It became hazy on heating to above 50° C. because of the cloud point of the polymeric additive.

From the foregoing illustrative working examples, it becomes clearly evident that the copolymerization in the presence of polymeric alkoxyalkyl vinyl ether allows copolymerization in slurries of very high solids, i.e., in the range of from 30 to 70 percent, preferably in the range of from 30 to 50 percent, and that the resulting product does not require the costly removal of the anti-clumping agent. As a consequence, higher capacities of productivity in the manufacture of the copolymer are achieved. The use of a polymer of alkoxyalkyl vinyl ether as an anti-clumping agent has the advantage of being compatible with the copolymer at the pH of dissolution in water. Since the cloud point of the copolymer is above 60° C., in water at a pH of 7, there is no need to remove the anti-clumping agent from the copolymer solution.

We claim:
1. In the process of copolymerizing maleic anhydride and at least one vinyl ether characterized by a formula selected from the class consisting of the following formulae:

(1) $\qquad CH_2=CHOR$ and (2) 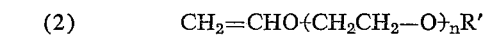$\qquad CH_2=CHO(CH_2CH_2-O)_nR'$ wherein R is an alkyl group of from 1 to 8 carbon atoms, R' is an alkyl group of from 1 to 4 carbon atoms and n is a positive integer of from 1 to 4, in an inert liquid hydrocarbon medium at a solids content of from about 25 to about 70 percent, in the presence of a free radical catalyst at a temperature of from 40° to 120° C., to yield a powdery granular copolymer upon evaporation of said liquid hydrocarbon medium and whose aqueous solutions are clear at room temperature, the improvement characterized in that the said process of copolymerizing is conducted in the presence of an anti-clumping agent selected from the class consisting of homopolymers of the monomer of said Formula 2 and copolymers of methyl vinyl ether and monomers of said Formula 2 in an amount ranging from about 0.1 to about 5% by weight based on the weight of the monomers present in the copolymerizing mixture.

2. In the process according to claim 1 wherein the monomer of the polymer anti-clumping agent has the formula:

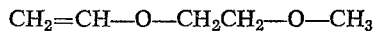$$CH_2=CH-O-CH_2CH_2-O-CH_3$$

3. In the process according to claim 1 wherein the monomer of the polymer anti-clumping agent has the formula:

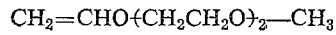$$CH_2=CHO(CH_2CH_2O)_2-CH_3$$

4. In the process according to claim 1 wherein the monomer of the polymer anti-clumping agent has the formula:

$$CH_3=CHO(CH_2CH_2O)_3-CH_3$$

5. In the process according to claim 1 wherein the monomer of the polymer anti-clumping agent has the formula:

$$CH_2CHO(CH_2CH_2O)_4-CH_3$$

6. In the process according to claim 1 wherein the alkoxy vinyl ether monomer of the copolymer anti-clumping agent has the formula:

$$CH_2=CHOCH_2CH_2OCH_3$$

References Cited

UNITED STATES PATENTS 2,782,182  2/1957  Verburg _____ 260—78.5

FOREIGN PATENTS 1,063,056  3/1967  Great Britain.

SAMUEL H. BLECH, Primary Examiner

R. J. SEIBERT, Assistant Examiner

U.S. Cl. X.R.

260—78.5, 29.6, 886, 885, 33.6; 204—159.15